(12) United States Patent
Pillarisetty et al.

(10) Patent No.: US 9,374,509 B2
(45) Date of Patent: Jun. 21, 2016

(54) WEARABLE IMAGING SENSOR FOR COMMUNICATIONS

(71) Applicants: Ravi Pillarisetty, Portland, OR (US); Sairam Agraharam, Chandler, AZ (US); John S. Guzek, Chandler, AZ (US); Christopher J. Jezewski, Hillsboro, OR (US)

(72) Inventors: Ravi Pillarisetty, Portland, OR (US); Sairam Agraharam, Chandler, AZ (US); John S. Guzek, Chandler, AZ (US); Christopher J. Jezewski, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 645 days.

(21) Appl. No.: 13/717,254

(22) Filed: Dec. 17, 2012

(65) Prior Publication Data

US 2014/0168355 A1 Jun. 19, 2014

(51) Int. Cl.
*H04N 7/00* (2011.01)
*H04N 5/225* (2006.01)
*H04N 101/00* (2006.01)

(52) U.S. Cl.
CPC ............ *H04N 5/225* (2013.01); *H04N 2101/00* (2013.01)

(58) Field of Classification Search
CPC ............ H04N 5/23238; H04N 5/2628; H04N 5/2259; G06T 3/4038; G02B 13/06
USPC .......................................................... 348/36
See application file for complete search history.

(56) References Cited

U.S. PATENT DOCUMENTS

| | | | |
|---|---|---|---|
| 2003/0133008 A1* | 7/2003 | Stephenson | 348/47 |
| 2008/0112683 A1* | 5/2008 | Lin et al. | 386/52 |
| 2010/0245585 A1* | 9/2010 | Fisher et al. | 348/164 |

* cited by examiner

*Primary Examiner* — William C Vaughn, Jr.
*Assistant Examiner* — Daniel Tekle
(74) *Attorney, Agent, or Firm* — Blakely, Sokoloff, Taylor & Zafman LLP

(57) ABSTRACT

A wearable image sensor is described. In one example, an apparatus includes a camera to capture images with a wide field of view, a data interface to send camera images to an external device, and a power supply to power the camera and the data interface. The camera, data interface, and power supply are attached to a garment that is wearable.

19 Claims, 5 Drawing Sheets

WEARABLE IMAGING SENSOR FOR COMMUNICATIONS

FIELD

The present description relates to wearable sensors and in particular to a wearable camera capable of connection to display and information systems.

BACKGROUND

A variety of applications have developed that allows smartphone users to use the built-in cameras that are included in many such phones. In some cases, data from the camera is sent by the smartphone to servers for some purpose. As examples of using a camera, the phone may be used to send images to friends, upload pictures to social networking or photo sharing sites, or to find product information using a camera image of a Quick Response Code.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Wearable technology can extend mobile computer usage beyond its current state. When a sensor is integrated into a mobile device, the user may be required to hold the device one way to image an object and a different way to use the device. In addition, because sensors, such as cameras are directional with a limited field of view typically 30 to 70 degrees horizontal, the camera can only capture a limited view of the area surrounding a user, not a full 180 degrees around the consumer. Even the limited directional view can only be captured when the camera is held in a particular way.

By mounting, attaching, integrating, or embedding the camera into a shirt, hat, or pants, all objects in front of the user may be sensed, imaged, and captured in a panoramic 180 degree visual plane. The sensor element may be integrated into clothing either as an attachable element such as a pin or as a semi-permanent attached element.

The cameras or sensors may then transfer the image to the user's handheld or other type of mobile device. In one embodiment, the sensor may be equipped with circuitry and a wireless antenna to transmit data to a mobile device. In another example, the sensor may be equipped with fiber optic ports to seamlessly transfer data at a high rate of speed to the mobile device. The captured images may then be used with image recognition software to help improve the overall mobile experience of the user.

Figure 1:
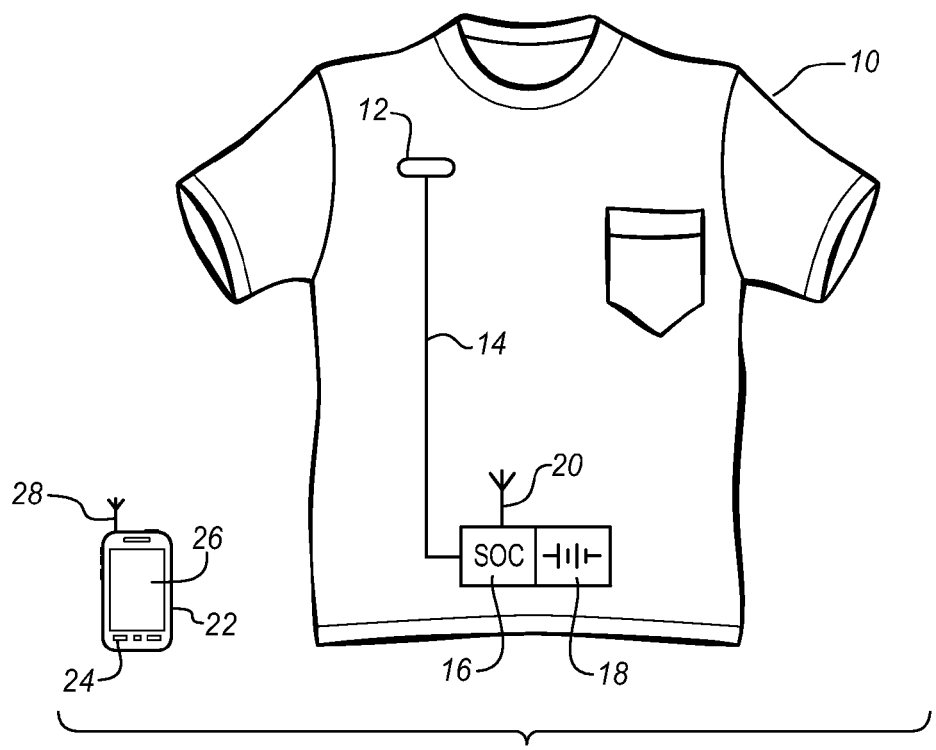
FIG. 1 is a diagram of a wearable camera as part of a garment and a mobile computer system according to an embodiment of the invention.

FIG. 1 is a diagram of a wearable camera and computer system according to an embodiment of the invention. A garment 10, for example a shirt, carries a camera sensor 12 that is coupled through a wire interface 14 to an electronic device on the garment. The electronic device may include a system on a chip 16 coupled to a battery 18 or other type of power supply and an antenna 20 for external communications. The camera sensor 12 captures images and conveys them through the wired connection 14 to a data interface of the system on a chip 16. The wired connection may be electrical, optical, or wireless. The wire may be embedded into the garment or separate from the garment and attached to the garment.

The data interface of the system on a chip 16 receives the images and processes them depending on the particular application. The external antenna 20 allows the processor to communicate with external devices 22 such as a smartphone, tablet, external computer, wearable computer, or data relay terminal. In the example of FIG. 1 the external device is a smartphone with a user interface 24, a display 26, and an external antenna 28 for communication with the wearable camera system 20 and with external servers (not shown).

While the processing resources 16 and power supply 18 are shown as being separate and apart from the camera module 12, this is not required. All components may be integrated into a single camera module which transmits information directly to an external device. The images captured by the camera may be further processed by the camera module 20 or by the connected processor 16. Alternatively, raw image data may be sent directly to an external device 22 for processing.

Figure 2:
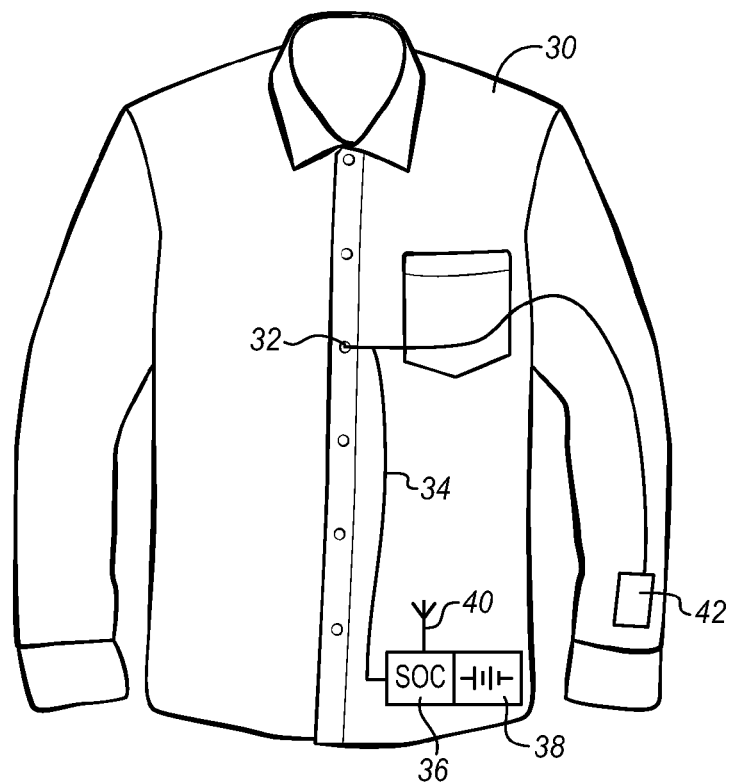
FIG. 2 is a diagram of a wearable camera and a mobile computer system as part of a garment according to an embodiment of the invention.

FIG. 2 shows an alternative implementation integrated with a garment 30, in this case a shirt. However any other suitable garment may be used including a blouse, a jacket, a coat, a hat, or pants. The garment has a camera module 32 in the shape of a shirt button which is sewn onto the garment in a conventional manner. The camera module is connected through a communication link 34 which may be electrical or optical or wireless to a processing system that includes a system on a chip 36 and a power supply 38.

The processing module is also coupled to a display 42 which, in this case, is connected or embedded into a sleeve of the shirt. The display may be a touch screen display or it may include user interface buttons that allow the user to view the display and send commands and instructions from the display or associated components 42 back to the processing system 36. In this example the shirt 30 is a wearable computer with an awareness of its surrounding environment through the camera module 32.

While only one camera module is shown in the examples of FIGS. 1 and 2, additional camera modules may be provided in other positions on the garment. Using a front facing camera as shown, the imaging system is provided with an awareness of the surrounding conditions in front of the user which is the direction in which the user is usually headed. This allows the system to provide the user with information about what is in the user's path.

The camera 12, 32 and SOC 16, 36 may be embedded into or incorporated into or attached to the garment in any of a variety of different ways. They may be connected using a pin through the fabric of the garment so that the camera may easily be removed and then attached to other garments. Straps and belts may alternatively be used. Similarly hook and loop fasteners may be used to hold the camera sensor, SOC, and screen to the garment. They may be held in some type of holder incorporated into the garment such as a special pocket, flap, or tab. They may be sewn into the garment as a separate structure such as the button camera 32 of FIG. 2 or woven into the fabric. Some parts may be attached in one way and other parts in different ways.

Figure 3:
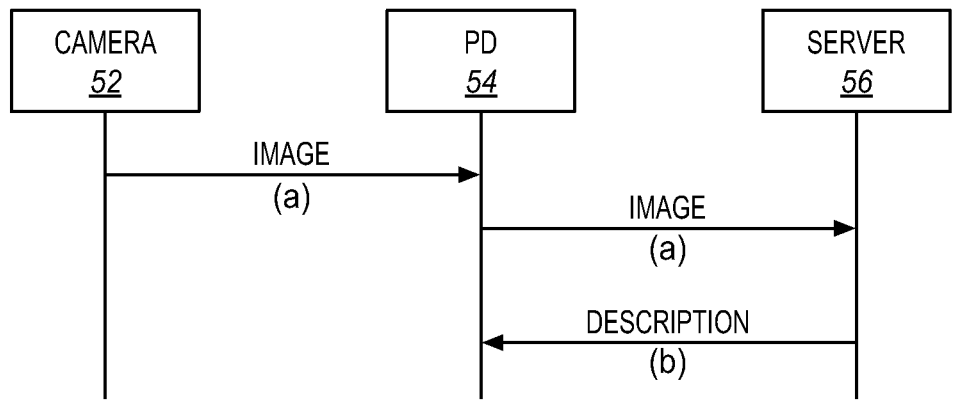
FIG. 3 is a signaling diagram of sending an image to a server through a portable device according to an embodiment of the invention.

A variety of different kinds of communications are possible using the wearable camera system shown in FIGS. 1 and 2. As an example FIG. 3 is a signal flow diagram to show communications between a camera 52, a processing device 54, and an external server 56. In the example of FIG. 3 the camera system sends an image in signal (a) to the processing device. The image (a) is then forwarded from the processing device 54 to the server 56. The server analyzes the image and returns descriptive information related to the image back to the processing device. This information may be a description of an item in the image, purchasing, historical, or status information about an item in the image, or information about objects or services near an object in the image, among other kinds of information. The processing device 54 may be an integral part of the imaging system such as the wearable computer 36 of FIG. 2, an external handheld or portable device, such as the smartphone 22 of FIG. 1, or a larger, more fixed computing device such as a desktop, workstation, or other fixed computer.

The communication of FIG. 3 allows the camera system to observe the surroundings in front of the user, send information about these surroundings to an information source 56, and then provide information to the user through the user's smartphone 22. This allows the user to hold the smartphone in any position and yet have full situational awareness about the environment immediately in front of the user. So for example as a tourist walking down the street, the user can be informed of buildings which are coming into view through a display on his smartphone 22. In another example, a plant maintenance worker can receive information on the smartphone about equipment, fixtures, and rigs which come into view of the camera system 12. This can be used for systems that are distant or for very close objects.

The tourist may obtain information about specific items displayed on store shelves or about monuments in a city park. Similarly, the maintenance worker may obtain information about large systems or detailed service information about a specific piece of equipment at a facility.

Using a smart phone, the wearable camera sensor system requires only a low power, short range connection to the smart phone, such as Bluetooth, Ultra-Low Power WiFi, or NFC (Near Field Communications). This allows for a lighter, smaller system with less need for recharging. The smart phone may then use a higher power long range radio, such as mobile cellular. Alternatively, a wearable system may be used in the same way except that the user views the information on the sleeve display screen 42. Using a camera mounted in a separate independent position, the sleeve display may be held in any position and yet the system obtains information about the environment in front of the user.

Figure 4:
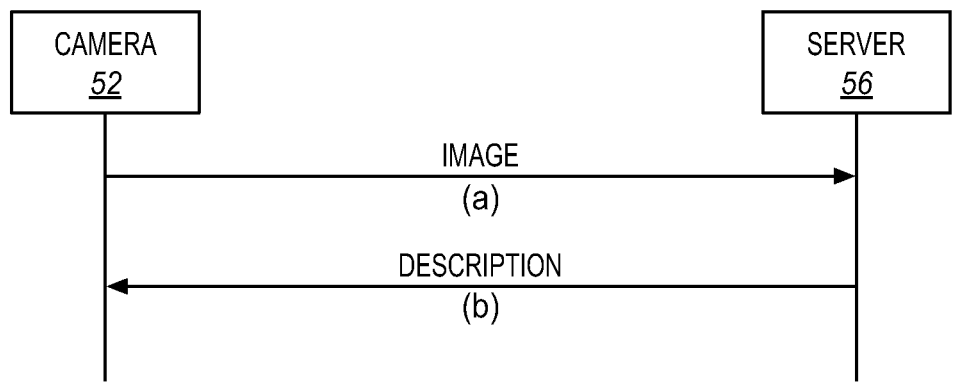
FIG. 4 is a signaling diagram of sending an image to a server according to an embodiment of the invention.

FIG. 4 presents a signaling diagram for an alternative signaling communication. In the example of FIG. 4 the camera 52 sends an image signal (a) directly to a server 56. The server 56 then sends a description (b) back to the camera 52. The camera can then present the information on an incorporated display 42 or send the descriptive information to an external device 22 for consideration by the user.

Figure 5:
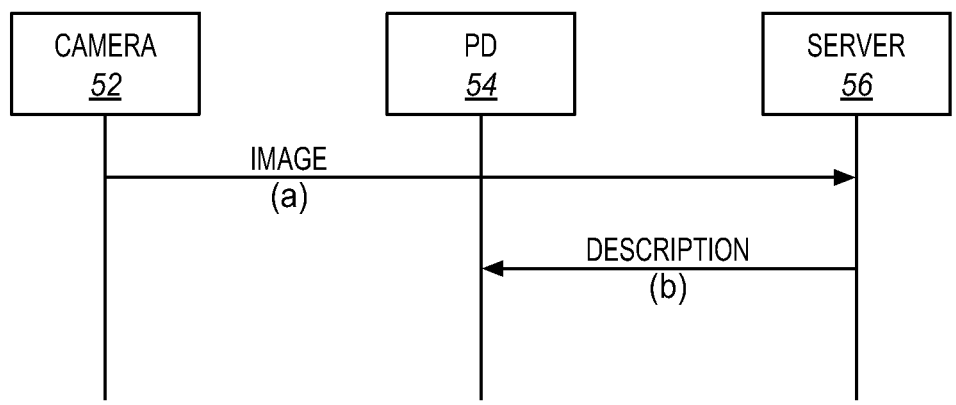
FIG. 5 is a signaling diagram of sending an image to a server and receiving information at a portable device according to an embodiment of the invention.

FIG. 5 presents another alternative signaling diagram. The camera 52 sends an image signal (a) directly to a server 56. However, the server sends the description information not to the camera but to the processing device 54. Because the camera system has a wireless antenna 20 40 attached to its processing resources 16, 36, it may be able to communicate through a cellular telephone network or a WiFi network directly to a remote server to obtain the desired information. This simplifies communications for the external device 22. However, the server can then send information directly to the user for display on the external device.

Figure 6A:
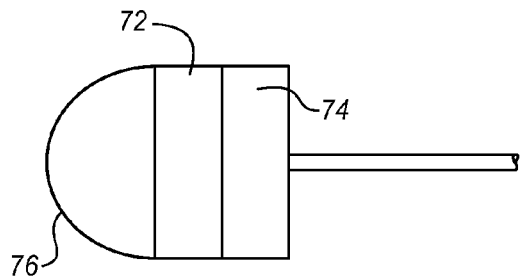
FIG. 6A is a top elevation view of a camera module with a horizontal panoramic field of view suitable for use with the present invention.

In the described examples the camera system 12, 32 may take many different configurations. It may be attached to the garment as an accessory or integrated into the garment as a button or a nonfunctional item. FIG. 6A is a top elevation view of a camera system for detecting images. A photo detector or image sensor 72 is coupled to an imaging processor 74 that generates an output signal for wired, optical, or radio communication. The sensor 72 sees the surrounding environment through a wide field view lens 76. The wide field of view lens may be a fish eye type lens or any other appropriate type lens. In the example of FIG. 6A the lens is shown as having a 180 degree and panoramic horizontal field of view so that the camera can observe everything that is in front of the user. The panoramic view may be more or less than 180 degrees, depending on the particular implementation.

Figure 6B:
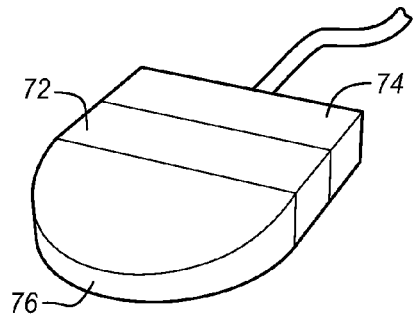
FIG. 6B is a perspective view of the camera module of FIG. 6A.

FIG. 6B is a perspective view of the same camera module as in FIG. 6A. This view shows that the fish eye lens 76 has a 180 degree field of view in a horizontal direction and a much narrower, for example a 60 degree field of view, in a vertical direction. Reducing the field of view in the vertical direction simplifies the lens, the imaging requirements of the sensor 72 and the processing requirements of the image processor 74 while still detecting most everything of interest to the viewer and the user.

Figure 7A:
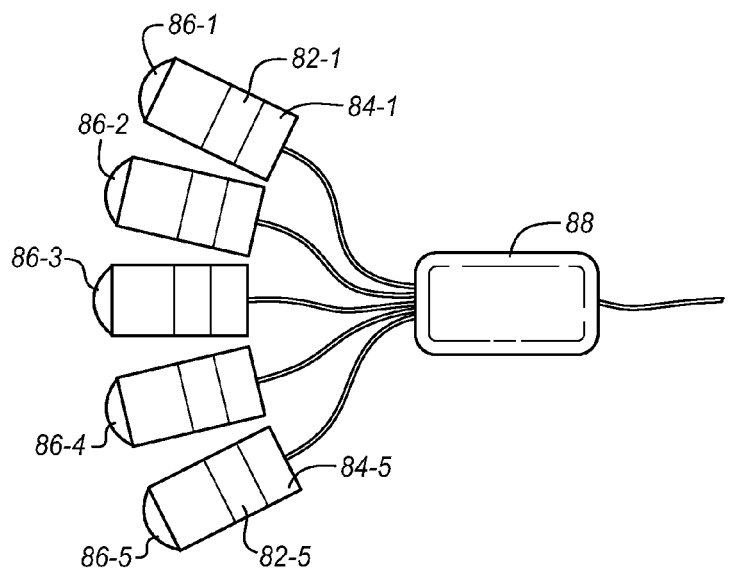
FIG. 7A is a top elevation view of a camera sensor system with multiple camera modules suitable for use with the present invention.
Figure 7B:
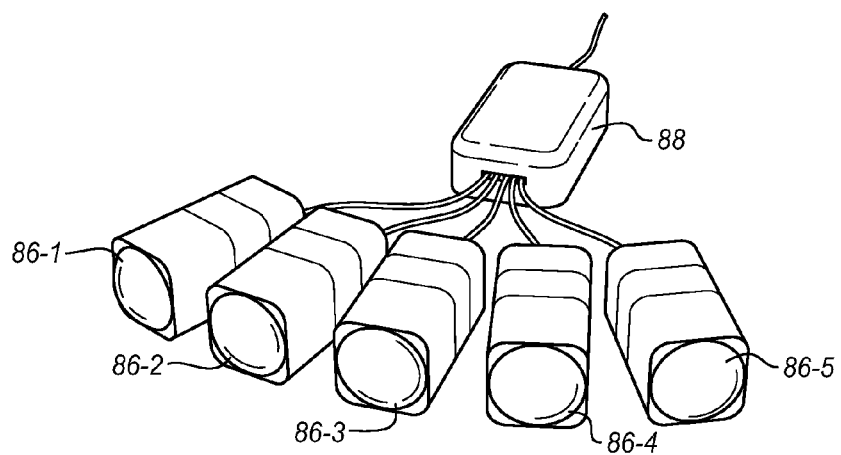
FIG. 7B is a perspective view of the camera sensor system of FIG. 7A.

FIG. 7A is a top elevation view of an alternative type of camera sensor system suitable for use as described with embodiments of the present invention. In this example five separate camera modules are coupled together to a single image processor 88. Each camera module includes a lens 86-1 to 86-5 for imaging a narrower field of view onto a photo detector 82-1 to 82-5. The data from each image sensor is then processed in a separate image processor 84-1 to 84-5. All of the processed imaged information is then consolidated and combined by an additional image processor 88. The additional image processor 88 is then coupled through an output interface to the processing resources 16, 36 of the system. Alternatively, each photodetector may be coupled into the same processor so that a single processor receives the raw data and generates a consolidated image. In such an implementation, the separate image processors 84-1 to 84-5 would not be needed.

Each camera module of FIG. 7A may be simpler and less expensive than that of FIG. 6A which may allow for a less expensive and yet more detailed view of the surroundings of the user. In one embodiment the camera modules may be independently switched on and off to save power and to switch between a panoramic view and a more detailed single camera view. The camera sensors may also be activated one at a time as a scanning array or a multiple spot imaging array. While five camera modules are shown, there may be fewer or many more. Additional or different types of camera sensors may be used including artificial compound eye sensors with many more than five individual camera modules.

Any type of camera module may be attached to a garment 10, 30 using a clip or a pin. The camera module may also be permanently attached by being sewn on such as the example of the camera sensor 32 of FIG. 2 which appears as and operates as a button to hold the shirt together. The camera module may also be outfitted with a special holder in the garment to hold the camera module in place.

Figure 8:
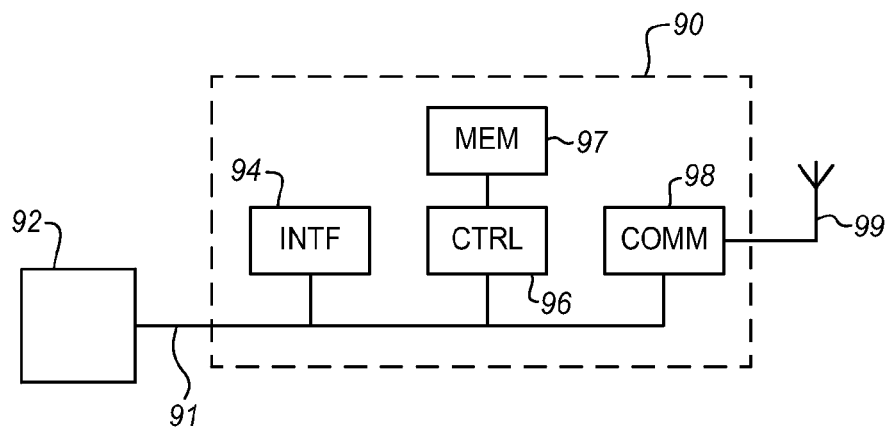
FIG. 8 is a block diagram of a processing system suitable for use with a camera sensor according to an embodiment of the invention.

The processing system 16, 36 may take a variety of different forms. A simple example is shown in the block diagram of FIG. 8. The processing system 90 is coupled to the camera module 92 through a data interface 94. The data interface may connect to the camera module using a wired or wireless connector 91, as explained above. The data interface is coupled to a controller 96 of the processor 90 which has internal memory resources 97 that may or may not be available to other components. The controller may be a simple FPGA (Field Programmable Gate Array) or a complex microprocessor with many functions, or any. The memory resources 97 may be magnetic, solid state, phase change, or any other type of memory depending on the particular implementation.

The controller 96 may also be connected to a communications interface 98 with, for example, an antenna 99 with which to send and receive data with external devices. Depending on the particular implementation, data from the camera 92 may be delivered through the data interface 94 directly through the communications interface 98 to be sent through the antenna 99 to other devices. Similarly, information may be received from the communications interface 99 to the controller for communication to the user. As shown a common bus connects the data interface, communications interface and controller to each other to exchange data, signaling, and commands. The memory may be connected directly to the bus or connected through the controller depending on the implementation.

Figure 9A:
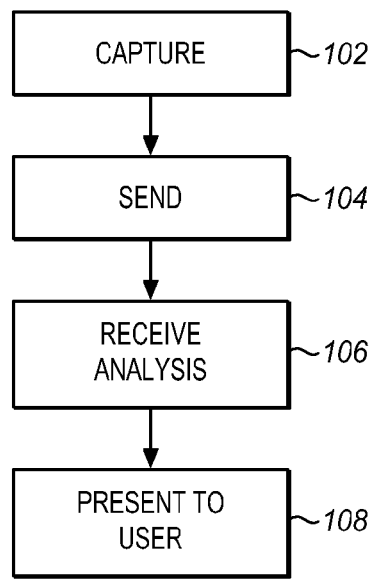
FIG. 9A is a process flow diagram of a first usage scenario according to an embodiment of the invention

FIG. 9A shows an example usage scenario as a process flow diagram for the camera and capture systems described above. At 102, the camera sensor captures an image using the photo detectors as described above. At 104, the image is sent to an external information source. This may be sent directly from a camera module or from a larger external device. The image may be sent to a remote server or to a local device for analysis, depending on the type of analysis and the capabilities of the local resources. At 106, the image is analyzed to find information, metadata, or other resources that are related to the image. Finally at 108, the analysis is sent back to the user for use. The analysis may be displayed on a screen as described or it may be presented with sound, such as a simulated voice or in any other way.

This process may be repeated as the camera sensor continues to capture images. The process may be timed so that a new image is sent a specific time intervals, such as once a second, once a minute, once every ten minutes, etc. The process may be triggered by user command or by a remote command or by the system. For example, the camera sensor may capture images and perform an analysis to determine if the scene has significantly changed. A significant change may be used as a trigger to send a new image. In addition, the image may be sent with additional information or commands based on an application currently in use or a request from the user.

Figure 9B:
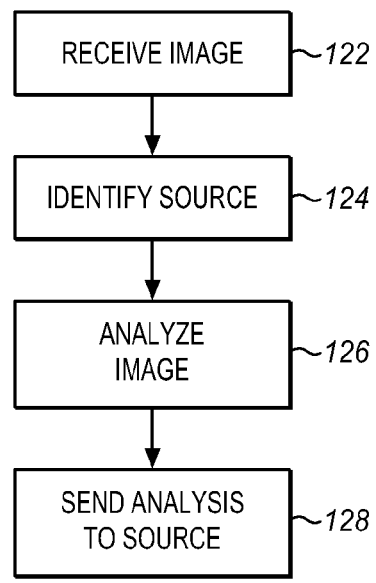
FIG. 9B is a process flow diagram of a second usage scenario according to an embodiment of the invention

FIG. 9B shows a related process as a process flow diagram from the perspective of the server. At 122, an image is received from the camera sensor at the server. While use with a remote server is described, the same functions may be performed locally on an external device or by a wearable computer. At 124, the source of the image is identified together with any commands, related applications, or other information that may be useful in analyzing the image. The source that sent the image may be associated with a user account, with network identification, with cookies in a web interaction or in any other way. In one embodiment the source is identified as having a particular IP (Internet Protocol) address and specific preferences for the type of information desired and where that information may be sent. In another embodiment, the server analyzed the image and determines an information set for the user based on the image and general information about what information is preferred by other users. The image may contain EXIF (Exchangeable Image File Format) or similar data providing an identification of the camera, the conditions when taking the image, and the time and location of the camera when the image was taken. This information together with any past images may be used when analyzing the image. At 126 the image is analyzed and at 128, the analysis is sent back to the source of the image. The analysis may be sent to the same device that sent the image or to a related device, such as a smart phone, a mobile computer, a fixed workstation, or a different remote server, depending upon how the camera system is configured and any preferences provided by the user.

Figure 10:
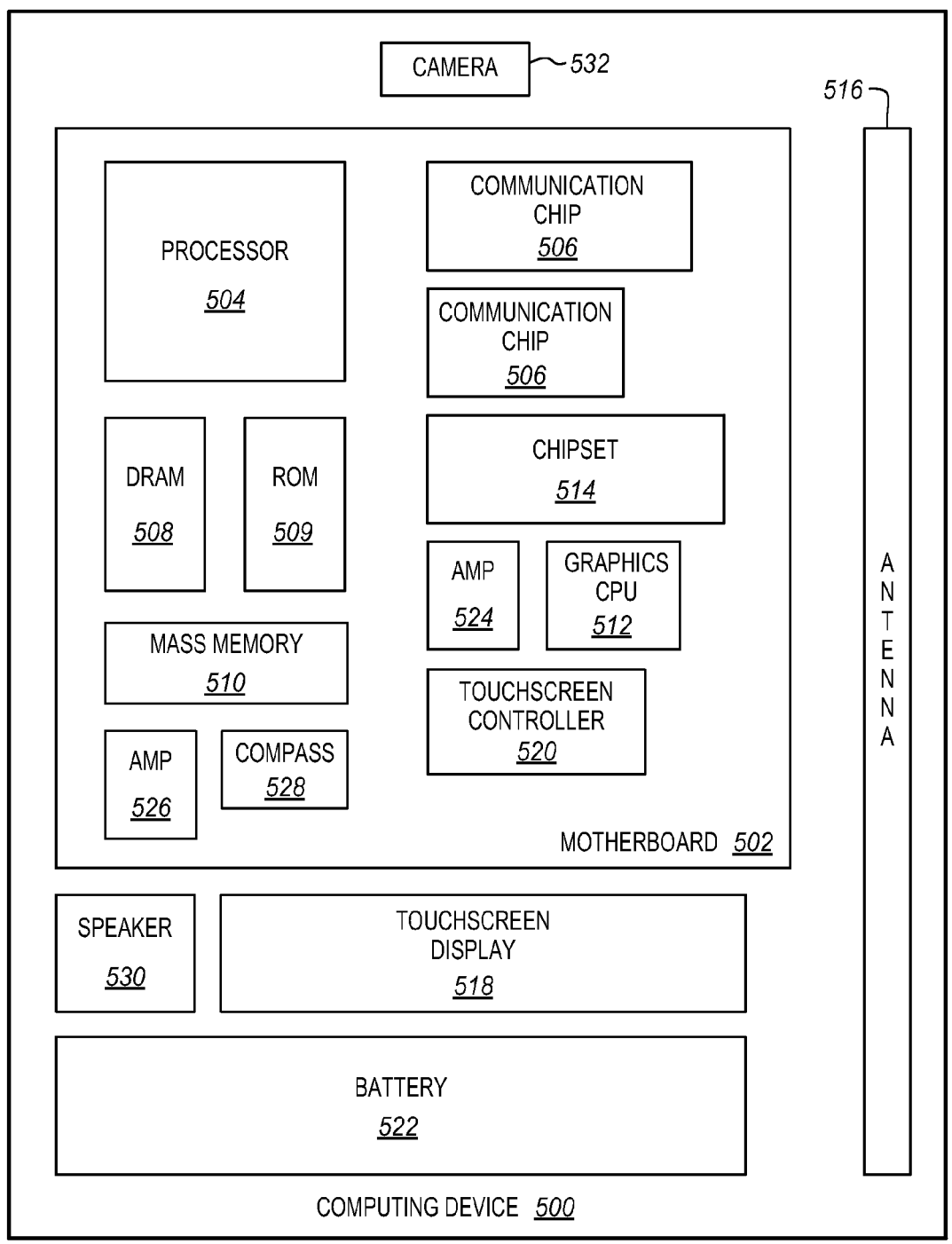
FIG. 10 is a block diagram of a computing device according to an embodiment of the invention.

FIG. 10 illustrates a computing device 500 in accordance with one implementation of the invention that may be used for the camera modules, the processing system 16, 36, or the external device. The computing device 500 houses a board 502. The board 502 may include a number of components, including but not limited to a processor 504 and at least one communication chip 506. The processor 504 is physically and electrically coupled to the board 502. In some implementations the at least one communication chip 506 is also physically and electrically coupled to the board 502. In further implementations, the communication chip 506 is part of the processor 504.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, a camera 532, and a mass storage device (such as hard disk drive) 510. These components may be connected to the system board 502, mounted to the system board, or combined with any of the other components.

The communication chip 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

The processor 504 of the computing device 500 includes an integrated circuit die packaged within the processor 504. The term "processor" may refer to any device or portion of a device that processes electronic data from registers and/or memory to transform that electronic data into other electronic data that may be stored in registers and/or memory.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an apparatus that comprises a camera to capture images with a wide field of view, a data interface to send camera images to an external device, and a power supply to power the camera and the data interface. The camera, data interface, and power supply are attached to a garment. In further embodiments, the camera is integrated into the garment, such as by using a pin, or being sewn to the garment.

In further embodiments, the camera has a panoramic field of view or a 180 degree horizontal field of view. In further embodiments, the data interface is an optic fiber interface, the data interface is a wireless interface, and the external device is a cellular telephone. In further embodiments the apparatus further includes a processor and image recognition software to process images captured by the camera before sending by the data interface.

In another embodiment an imaging and communication system comprises a camera to capture images and to send the images through a short range wireless interface, a data interface to receive the images from the camera through the short range wireless interface, a processor coupled to the data interface to process the images for analysis, and a long range wireless interface coupled to the processor to send the processed images to a remote device.

In further embodiments, the long range wireless image is further to receive information about the sent images from the remote device, a display is coupled to the processor to display the received information about the images, and a control interface coupled to the display to allow user control of the displayed information.

In another embodiment, a method comprises capturing an image in a camera attached to a garment, sending the image to an external device for analysis, receiving the analysis from the external device, and presenting the analysis to a user of the garment.

In further embodiments, sending the image comprises sending the image to a local portable device and the local portable device sending the image to a remote server. In further embodiments, the local portable device is also attached to the garment, or the local portable device is a cellular telephone. In further embodiments, sending the image further comprises sending additional information about the image including time and location, presenting the analysis comprises presenting information about the image on a display that is movable independent of the camera.

What is claimed is:

1. An apparatus comprising:
   a camera to capture images with a wide field of view;
   a data interface to send camera images to an external device for analysis and to receive an analysis from the external device, the analysis including information related to the image;
   a power supply to power the camera and the data interface; and
   a processor and image recognition software to process additional images captured by the camera before sending by the data interface, the processing to determine if a scene in the images has significantly changed in a new image and to send a new image to the remote device if there is a significant change in the scene, wherein the, camera, data interface, and power supply are attached to a garment.

2. The apparatus of claim 1, wherein the camera is integrated into the garment.

3. The apparatus of claim 2, wherein the camera is attached to the garment using a pin.

4. The apparatus of claim 2, wherein the camera is sewn to the garment.

5. The apparatus of claim 1, wherein the camera has a panoramic field of view.

6. The apparatus of claim 5, wherein the camera has a 180 degree horizontal field of view.

7. The apparatus of claim 1, wherein the data interface is an optic fiber interface.

8. The apparatus of claim 1, wherein the data interface is a wireless interface.

9. The apparatus of claim 1, wherein the external device is a cellular telephone.

10. An imaging and communication system comprising:
a camera to capture images and to send the images through a short range wireless interface;
a data interface to receive the images from the camera through the short range wireless interface;
a processor coupled to the data interface to process the images for analysis; and
a long range wireless interface coupled to the processor to send a new image to a remote device if there is a significant change in the scene.

11. The system of claim 10, wherein the long range wireless image is further to receive information about the sent images from the remote device.

12. The system of claim 11, further comprising a display coupled to the processor to display the received information about the images.

13. The system of claim 12, further comprising a control interface coupled to the display to allow user control of the displayed information.

14. A method comprising:
capturing an image in a camera attached to a garment, the images having a wide field of view;
sending the image through a data interface connected to the camera to an external device for analysis;
processing additional images captured by the camera to determine if a scene in the images has significantly changed in a new image;
sending a new image through the data interface to the remote device if there is a significant change in the scene;
receiving the analysis from the external device through the data interface, the analysis including information related to the image; and
presenting the analysis to a user of the garment.

15. The method of claim 14, wherein sending the image comprises sending the image to a local portable device and the local portable device sending the image to a remote server.

16. The method of claim 15, wherein the local portable device is also attached to the garment.

17. The method of claim 15, wherein the local portable device is a cellular telephone.

18. The method of claim 14, wherein sending the image further comprises sending additional information about the image including time and location.

19. The method of claim 14, wherein presenting the analysis comprises presenting information about the image on a display that is movable independent of the camera.

* * * * *